(12) United States Patent
Seagle

(10) Patent No.: US 10,762,924 B2
(45) Date of Patent: Sep. 1, 2020

(54) ELECTROSTRICTIVE CONTROL FOR THE WIDTH OF A TAPE-HEAD-ARRAY

(71) Applicant: Western Digital Technologies, Inc., San Jose, CA (US)

(72) Inventor: David J. Seagle, Morgan Hill, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/830,222

(22) Filed: Mar. 25, 2020

(65) Prior Publication Data
US 2020/0227078 A1 Jul. 16, 2020

Related U.S. Application Data

(62) Division of application No. 16/213,803, filed on Dec. 7, 2018.

(51) Int. Cl.
*G11B 5/55* (2006.01)
*G11B 5/187* (2006.01)
*G11B 5/008* (2006.01)

(52) U.S. Cl.
CPC ........ *G11B 5/5508* (2013.01); *G11B 5/00813* (2013.01); *G11B 5/187* (2013.01)

(58) Field of Classification Search
CPC ..... G11B 5/483; G11B 5/4873; G11B 5/5552; G11B 5/4833; G11B 5/56; G11B 5/596; G11B 5/5508; G11B 5/187; G11B 5/00813; G11B 5/265; G11B 5/4893; G11B 5/00817; G11B 5/29; G11B 5/00826
See application file for complete search history.

(56) References Cited

U.S. PATENT DOCUMENTS

| 5,021,906 | A | 6/1991 | Chang et al. |
| 5,500,777 | A | 3/1996 | Hasegawa et al. |
| 6,246,552 | B1 | 6/2001 | Soeno et al. |

(Continued)

FOREIGN PATENT DOCUMENTS

JP H04276308 A 10/1992

OTHER PUBLICATIONS

Biskeborn, Bob et al. "Tape Head Technology Information Storage Industry Consortium"; http://citeseerx.istpsu.edu/viewdoc/download?doi=10.1.1819.9407&rep=rep1&type=pdf; pp. 108-128; May 2012.

(Continued)

*Primary Examiner* — Brian E Miller
(74) *Attorney, Agent, or Firm* — Patterson & Sheridan, LLP; Steven Versteeg

(57) ABSTRACT

The present disclosure generally relates to tape heads for use in a tape drive system. The tape head includes a plurality of servo elements and a plurality of data elements disposed between the servo elements. An electrostrictive material is present in the tape head. Electrodes are coupled to the electrostrictive material to permit a voltage to be distributed across the electrostrictive material. The voltage causes the electrostrictive material to expand, and thus expand the tape head. By expanding the tape head by adding voltage, or contracting the tape head by lowering voltage, the spacing between adjacent data elements can be adjusted to match the spacing between adjacent data tracks on a tape.

20 Claims, 11 Drawing Sheets

(56) References Cited

U.S. PATENT DOCUMENTS

| | | |
|---|---|---|
| 6,487,045 B1 | 11/2002 | Yanagisawa |
| 6,700,729 B1 | 3/2004 | Beck et al. |
| 6,775,107 B2 | 8/2004 | Kasajima et al. |
| 6,859,345 B2 | 2/2005 | Boutaghou et al. |
| 7,054,097 B1 * | 5/2006 | Yip .................. G11B 5/09 |
| | | 360/53 |
| 7,068,473 B2 | 6/2006 | O'Neill |
| 7,099,115 B2 | 8/2006 | Yao et al. |
| 7,161,765 B2 | 1/2007 | Ichikawa et al. |
| 7,193,812 B2 | 3/2007 | Eaton |
| 7,239,465 B1 | 7/2007 | Watson et al. |
| 7,301,724 B2 | 11/2007 | Brittenham |
| 7,342,738 B1 | 3/2008 | Anderson et al. |
| 7,359,160 B2 | 4/2008 | Koga et al. |
| 7,474,495 B2 | 1/2009 | Weng et al. |
| 7,505,221 B2 | 3/2009 | Watson |
| 7,764,460 B2 | 7/2010 | Bates et al. |
| 8,045,290 B2 | 10/2011 | McKinstry et al. |
| 8,184,394 B2 | 5/2012 | Poorman et al. |
| 8,724,247 B2 * | 5/2014 | Poorman .............. G11B 5/584 |
| | | 360/75 |
| 8,773,810 B2 | 7/2014 | Biskeborn et al. |
| 8,804,270 B2 | 8/2014 | Hamidi et al. |
| 8,982,513 B1 | 3/2015 | Tian et al. |
| 9,007,712 B1 * | 4/2015 | Biskeborn ............ G11B 5/4893 |
| | | 360/55 |
| 9,373,346 B1 * | 6/2016 | Bui .................. G11B 5/584 |
| 9,495,985 B2 | 11/2016 | Biskeborn et al. |
| 9,892,751 B1 | 2/2018 | Harper |
| 10,395,682 B2 | 8/2019 | Harper |
| 2002/0163752 A1 * | 11/2002 | Peterson ............. G11B 5/584 |
| | | 360/76 |
| 2003/0227702 A1 | 12/2003 | Watson et al. |
| 2005/0007700 A1 * | 1/2005 | Nagai ................ G11B 5/584 |
| | | 360/241.1 |
| 2005/0162781 A1 * | 7/2005 | McCarthy ............ G11B 5/584 |
| | | 360/261.1 |
| 2005/0190485 A1 * | 9/2005 | Ito .................. G11B 5/581 |
| | | 360/77.12 |
| 2006/0050428 A1 | 3/2006 | Brittenham |
| 2006/0061238 A1 | 3/2006 | Ikeda et al. |
| 2006/0126212 A1 | 6/2006 | Anderson et al. |
| 2007/0211389 A1 | 9/2007 | Abe |
| 2010/0067139 A1 | 3/2010 | Bates et al. |
| 2010/0214688 A1 | 8/2010 | Biskeborn et al. |
| 2012/0188665 A1 | 7/2012 | Biskeborn et al. |
| 2012/0206832 A1 | 8/2012 | Hamidi et al. |

OTHER PUBLICATIONS

Bain, James, "Recording Heads: Write Heads for High-Density Magnetic Tape"; Department of Electrical and Computer Engineering, SPIE vol. 2604, http://www.insic.org/news/2012Roadmap/PDF/24_Roadmap%20-%20Heads%20-%20FormattedV5.0.pdf3; pp. 165-175.

* cited by examiner

ELECTROSTRICTIVE CONTROL FOR THE WIDTH OF A TAPE-HEAD-ARRAY

CROSS-REFERENCE TO RELATED APPLICATIONS

This application is a divisional of co-pending U.S. patent application Ser. No. 16/213,803 filed Dec. 7, 2018, which is herein incorporated by reference.

BACKGROUND OF THE DISCLOSURE

Field of the Disclosure

Embodiments of the present disclosure generally relate to a tape head drive and a method for manufacture thereof.

Description of the Related Art

Tape heads are used to record and read back information on tapes by magnetic processes. The tape head comprises servo elements and data elements that are arranged in an array that is oftentimes referred to as a tape head array. The tape contains servo tracks and data tracks. The tape head uses the servo elements to read the servo tracks on the tape to align the tape heads relative to the tape.

The tape head array typically has two servo elements that are disposed near an edge of the tape head to align the data elements with the data tracks of the tape. A mismatch between data elements and the data tracks can occur when the spacing between adjacent data elements of the tape head is different from the spacing between adjacent data tracks of the tape. No matter how precise the servo system tracks align with the servo elements, a spacing mismatch means the tape head and tape are misaligned. A significant track density increase could be attained with good alignment and, more importantly, matched spacing.

Therefore, there is a need in the art for a tape head in which the spacing between adjacent data elements matches the spacing between adjacent data tracks.

SUMMARY OF THE DISCLOSURE

The present disclosure generally relates to tape heads for use in a tape drive system. The tape head includes a plurality of servo elements and a plurality of data elements disposed between the servo elements. An electrostrictive material is present in the tape head. Electrodes are coupled to the electrostrictive material to permit a voltage to be distributed across the electrostrictive material. The voltage causes the electrostrictive material to expand, and thus expand the tape head. By expanding the tape head by adding voltage, or contracting the tape head by reducing voltage, the spacing between adjacent data elements can be adjusted to match the spacing between adjacent data tracks on a tape.

In one embodiment, a tape head is disclosed. The tape head comprises a tape head body having: a first servo head; a second servo head; and a plurality of data heads disposed between the first servo head and the second servo head. The tape head also comprises an electrostrictive material coupled to the tape head body.

In another embodiment, a tape head is disclosed. The tape head comprises a tape head body having: a first servo head; a second servo head; and a plurality of data heads disposed between the first servo head and the second servo head. The tape head also comprises a plurality of segments of electrostrictive material coupled to the tape head body; a first conductive material coupled to a first portion of each segment of the plurality of segments of electrostrictive material; and a second conductive material coupled to a second portion of each segment of the plurality of segments of electrostrictive material, wherein the first conductive material is electrically isolated from the second conductive material.

In another embodiment, a tape head is disclosed. The tape head comprises a tape head body disposed on a substrate, the tape head body having: a first servo head; a second servo head; and a plurality of data heads disposed between the first servo head and the second servo head. The tape head also comprises an electrostrictive material coupled to the tape head body; and a plurality of electrodes interspersed within the electrostrictive material, wherein a first portion of the plurality of electrodes are electrically coupled together, wherein a second portion of the plurality of electrodes are electrically coupled together, and wherein the first portion of the plurality of electrodes are electrically isolated from the second portion of the plurality of electrodes.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

The present disclosure generally relates to tape heads for use in a tape drive system. The tape head includes a plurality of servo elements and a plurality of data elements disposed between the servo elements. An electrostrictive material is present in the tape head. Electrodes are coupled to the electrostrictive material to permit a voltage to be distributed across the electrostrictive material. The voltage causes the electrostrictive material to expand, and thus expand the tape head. By expanding the tape head by adding voltage, or contracting the tape head by reducing voltage, the spacing between adjacent data elements can be adjusted to match the spacing between adjacent data tracks on a tape.

Figure 1:
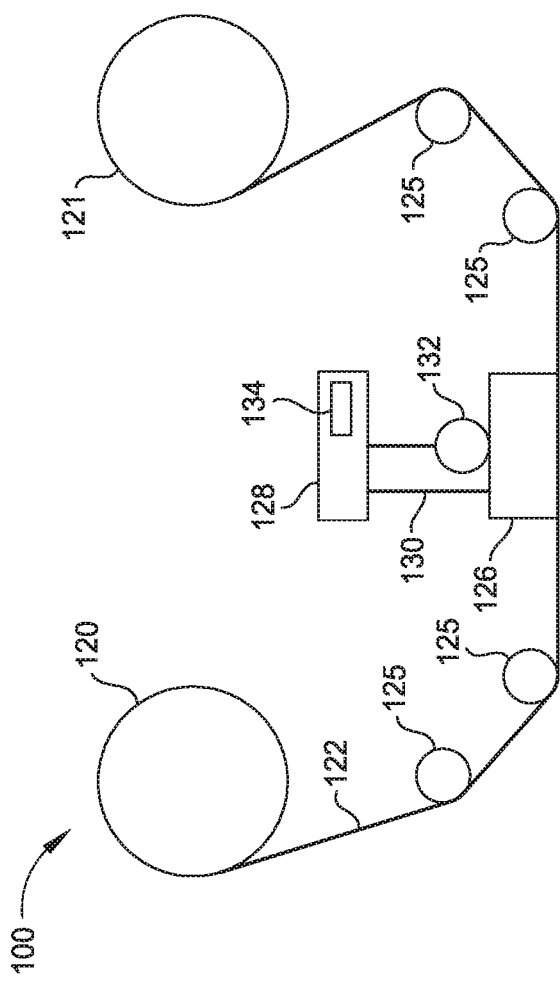
FIG. 1 is a schematic illustration of a tape drive according to one embodiment disclosed herein.

FIG. 1 is a schematic illustration of a tape drive 100 according to one embodiment disclosed herein. While one specific implementation of a tape drive is shown in FIG. 1, it should be noted that the embodiments describe herein may be implemented in the context of any type of tape drive system.

As shown, a tape supply cartridge 120 and a take-up reel 121 are provided to support a tape 122. One or more of the reels 121 may form a part of a removable cartridge and are not necessarily part of the tape drive 100. The tape drive, such as that illustrated in FIG. 1, may further include drive motor(s) (not shown) to drive the tape supply cartridge 120 and the take-up reel 121 to move the tape 122 over a tape head 126 of any type. Such head may include an array of data heads and servo heads (not shown in FIG. 1).

Guides 125 guide the tape 122 across the tape head 126 via a cable 130. The controller 128 typically controls head functions such as servo following writing, reading, etc. The controller 128 may operate under logic known in the art, as well as any logic disclosed herein. The cable 130 may include read/write circuits to transmit data to the head 126 to be recorded on the tape 122 and to receive data read by the head 126 from the tape 122. An actuator 132 controls the position of the head 126 relative to the tape 122.

An interface 134 may also be provided for communication between the tape drive and the host (integral or external) to send and receive the data and for controlling the operation of the tape drive and communicating the status of the tape drive to the host, as will be understood by those of skill in the art.

As noted above, the data elements on the tape head can become misaligned with the data tracks on the tape. The misalignment is due to the spacing between adjacent data tracks being different than the spacing between adjacent data elements. One manner to correct the different spacing is by stretching (or compressing) the tape, however, stretching the tape will diminish the lifetime of the tape. Another option is to physically expand or contract the tape head by applying force to one side of the tape head, but such force is not good for the tape head integrity. The tape head may be expanded or contracted by heating or cooling the tape head, but again, the tape head integrity is not good. Finally, a piezoelectric material may be inserted into the tape head to control the tape head expansion or contraction, but the piezoelectric material placement involves an annealing process that is not good for the tape head. As discussed herein, there is a new manner for expanding or contracting the tape head that does not diminish tape head integrity or stretch the tape.

Figure 2A:
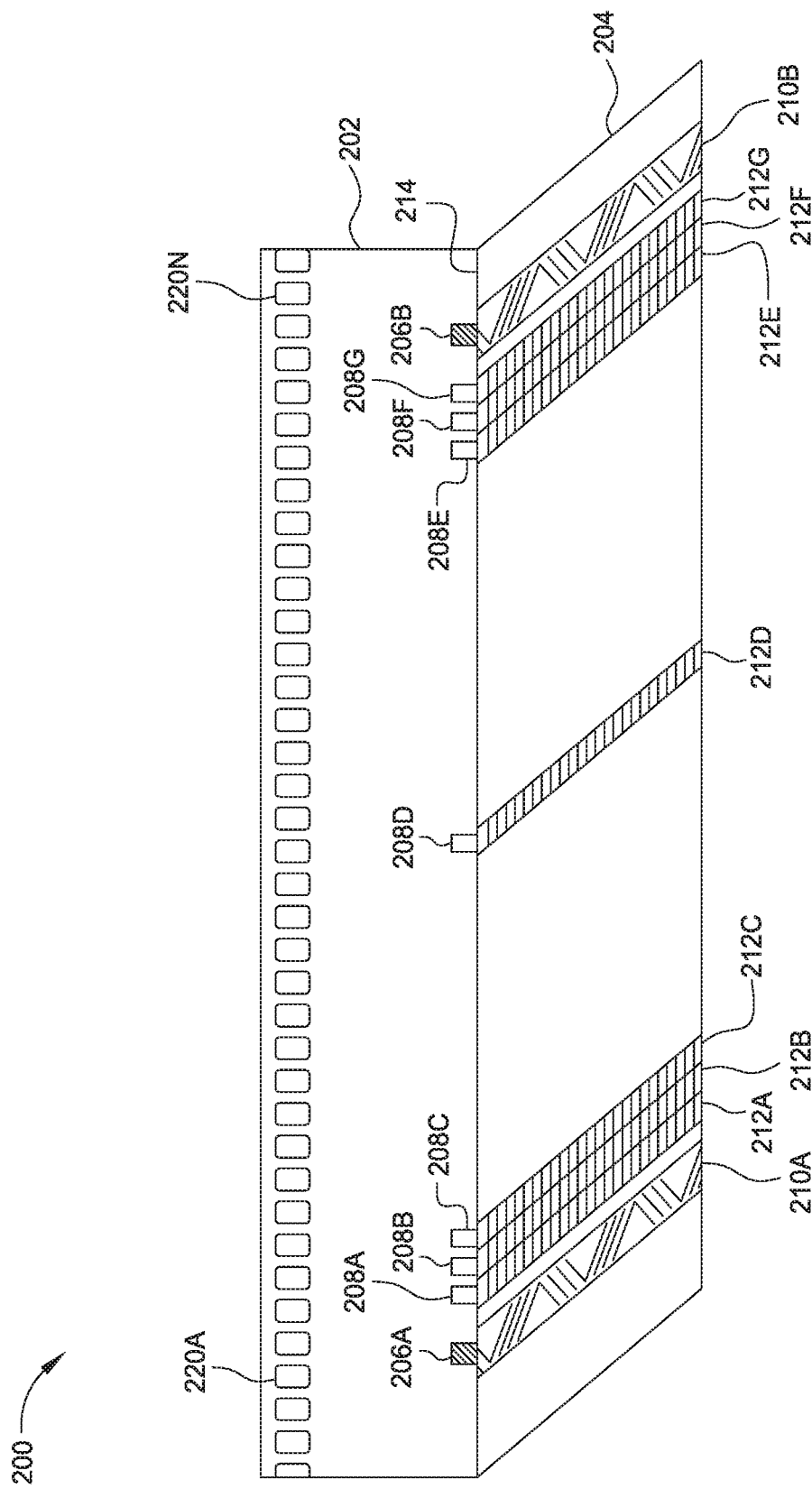
FIG. 2A is a schematic illustration of a tape head and tape that are aligned.

FIG. 2A is a schematic illustration of a tape head 200 and a tape 204 that are aligned. The tape head 200 comprises a tape head body 202 that is aligned with the tape 204. The tape 204 moves past the tape head 200 during read and/or write operations. The tape head 200 has a media facing surface 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2A. Rather, more or less pads are contemplated.

The tape 204 comprises a first servo track 210A and a second servo track 210B. The first servo track 210A and the second servo track 210B are spaced apart. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited the seven data tracks. Rather, the number of data tracks can be more or less than seven, depending on the requirements of the embodiment. In the embodiment of FIG. 2A, the first servo head 206A is aligned with the first servo track 210A. The second servo head 206B is aligned with the second servo track 210B. The plurality of data heads 208A-208G is individually aligned with the plurality of data tracks 212A-212N. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 2B:
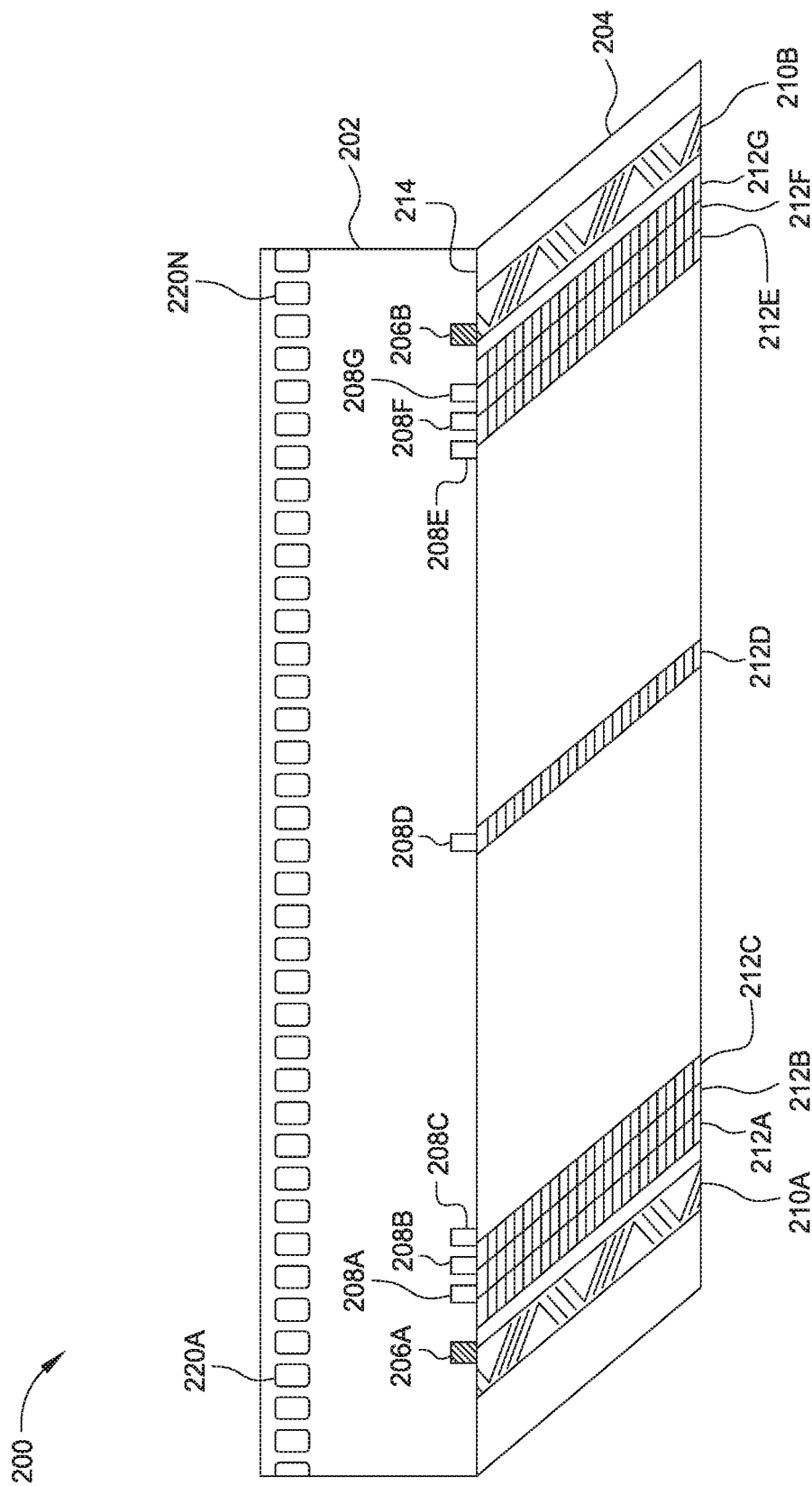
FIG. 2B is a schematic illustration of a tape head and a tape that are misaligned.

FIG. 2B is a schematic illustration of a tape head 200 and a tape 204 that are misaligned. As mentioned above, the data tape head 202 and the tape 204 do not always align. As shown in FIG. 2B, the first servo head 206A is not aligned with the first servo track 210A, and the second servo head 206B is not aligned with the second servo track 210B. Additionally, the plurality of data heads 208A-208G is not aligned with a corresponding data track of the plurality of data tracks 212A-212N. As shown in FIG. 2B, due to the misalignment, the plurality of data heads 208A-208G are not able to read and/or write the data to/from the plurality of data tracks 212A-212G.

Figure 3:
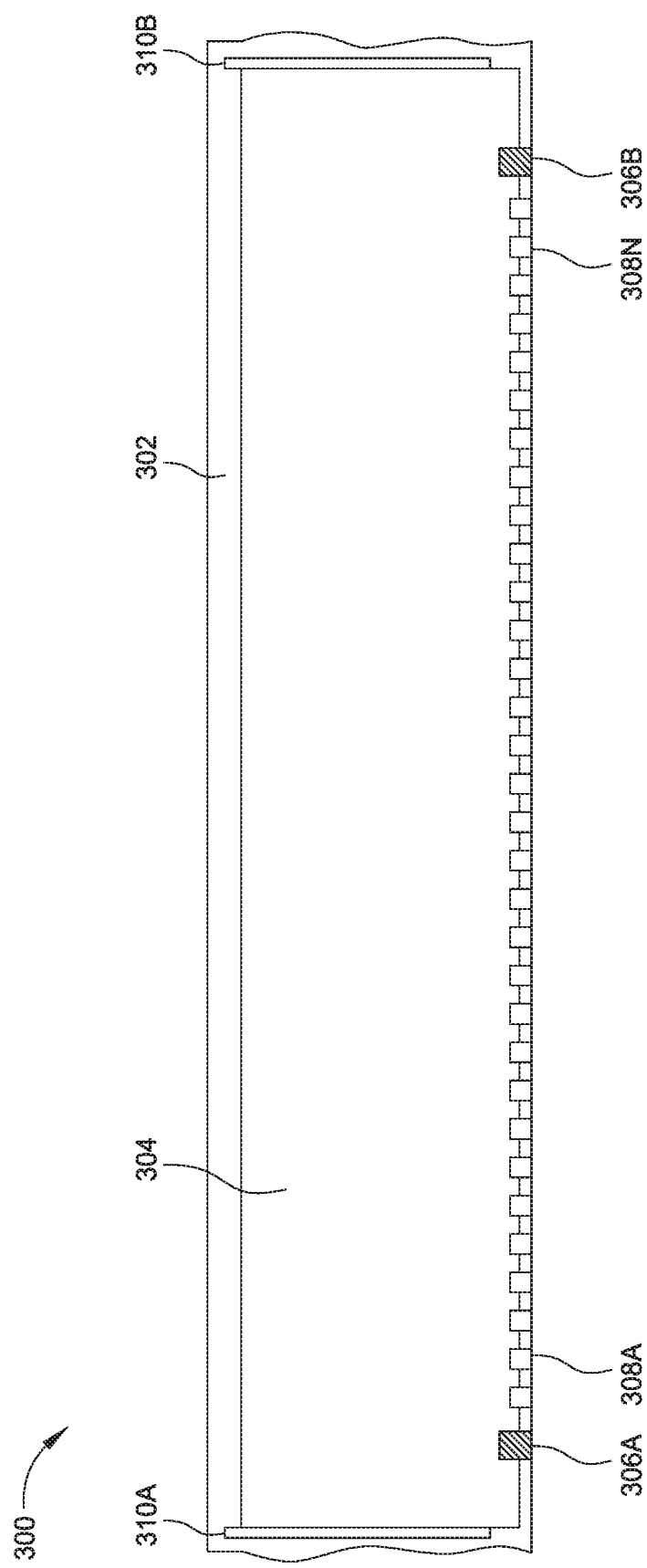
FIG. 3 is a schematic illustration of a tape head having an electrostrictive material according to one embodiment.

FIG. 3 is a schematic illustration of a tape head 300 having an electrostrictive material 304 according to one embodiment. The tape head 300 comprises a tape head body 302. The tape head body 302 comprises the electrostrictive material 304. The electrostrictive material 304 comprises, but is not limited to, a material selected from the group consisting of lead magnesium niobate, lead magnesium niobate-lead titanate, lead lanthanum zirconate titanate, lead zinc niobate, and combinations thereof. The electrostrictive material 304 is coupled to a first electrode 310A and a second electrode 310B.

The first electrode 310A and the second electrode 310B are spaced apart by the electrostrictive material 304. The first electrode 310A and the second electrode 310B are disposed on opposite edges of the electrostrictive material 304. The first servo head 306A and a second servo head 306B are electrically coupled to the tape head body 302. A plurality of data heads 308A-308N is disposed between the first servo head 306A and the second servo head 306B.

As discussed above, a data tape head and corresponding tape do not always align due to the mismatch of length in the two arrays. A servo system attempts to center the data tape head and the tape as much as possible on the two servo tracks. One manner to align the data tape head and tape is to stretch the tape. The problem with stretching of the tape is that the lifetime of the tape is reduced. Another potential manner to align the data tape head and the tape is to expand and/or contract the data tape head by outside mechanisms which causes tension on the data tape head and decreases the lifetime of the data tape head. Another potential manner to align the data tape head and the tape is to use heat to expand the data tape head, however, the data tape head and cannot accept a lot of heat and will thus degrade. Finally, adding a piezoelectric material to the data tape head is contemplated, but the fabrication of the piezoelectric material in the data tape head would necessitate annealing the data tape head and thus, would degrade the data tape head performance.

Adding an electrostrictive material 304 embedded in the data tape head will allow the data tape head 300 to expand to be aligned with the tape without any annealing. A voltage can be applied across the electrostrictive material 304 via the first electrode 310A and the second electrode 310B. When the electrostrictive material 304 has a voltage applied, the electrostrictive material 304 will expand. As the electrostrictive material 304 expands, the data tape head 300 expands as well. No heat is used when applying a voltage to the electrostrictive material 304. Thus, by applying a current across the electrostrictive material 304, the data tape head 300 can expand to properly ensure alignment with the tape.

For example when a low voltage of 20V is applied to the electrostictive material 304, the data tape head 300 would expand by a certain, calculable amount, such as one nanometer. While small, one nanometer of movement may be sufficient to align the data tape head 300 with the tape. However, one nanometer of movement may not be sufficient to align the data tape head 300 and the tape. Additionally, while 20V is a low voltage, 20V is a significant amount of voltage to apply with such little expansion.

If the electrostricitive material is broken into pieces, greater expansion may occur. For example if the electrostrictive material 304 is broken into two separate pieces and the same 20V is applied across each separate piece of the electrostricitive material 304, the effect of the 20V will be quadrupled due to the electric field being doubled. The voltage is squared based on the number pieces the electrostrictive material. By adding a plurality of electrostrictive material pieces, each coupled to a plurality of electrodes, the amount voltage used can be reduced to allow the data tape head 300 to move a larger amount to align with the tape.

It is to be understood that the tape head need not simply expand, but can also contract. Therefore, in operation, the tape head will typically have a bias applied so that the tape head is normally expanded by a predetermined amount. Thus, in the case where the tape head needs to expand more, additional voltage can be applied. However, in the case where the tape head needs to contract, the voltage can be reduced or removed to permit the tape head to contract. In order to contract, yet still align with the tape, the spacing between adjacent elements (i.e., data heads and servo heads) may be spaced apart (when no voltage is applied), but a distance that is generally smaller than the tape. Thus, the element spacing on the tape head is smaller than the element spacing on the tape. In the case where the tape is undistorted, the tape head would operate a a specific bias voltage to bring the tape head elements in line with the tape elements. If the tape is distorted so that the tape elements are closer together than in an undistorted case, the voltage applied to the tape head can be reduced from the voltage applied in the undistorted case. If the tape is distorted so that the tape elements are farther apart than in an undistorted case, the voltage applied to the tape head can be increased from the voltage applied in the undistorted case.

Figure 4:
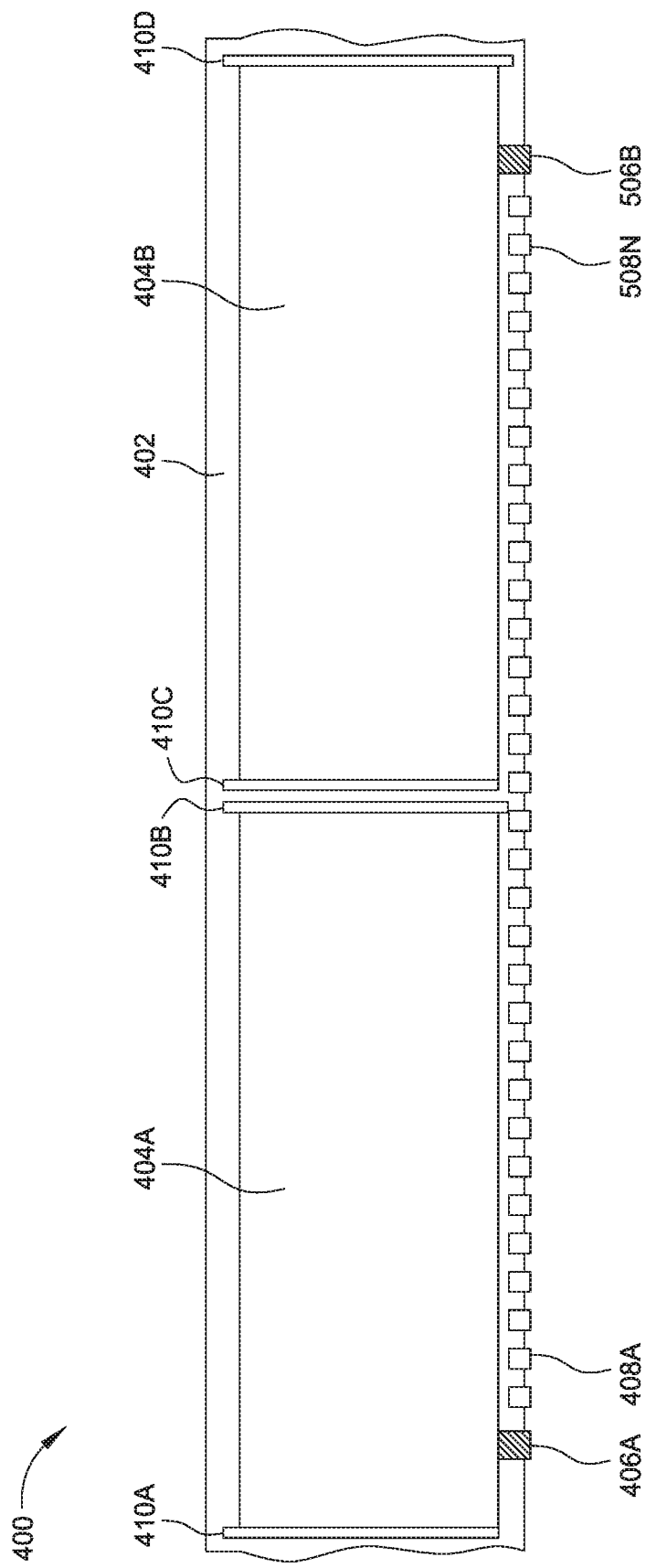
FIG. 4 is a schematic illustration of a tape head having an electrostrictive material according to another embodiment.

FIG. 4 is a schematic illustration of a tape head 400 having an electrostrictive material according to another embodiment. The tape head 400 comprises a tape head body 402. The tape head body 402 comprises a first electrostrictive material 404A and a second electrostrictive material 404B. The electrostrictive material 404A and 404B comprises, but is not limited to, a material selected from the group consisting of lead magnesium niobate, lead magnesium niobate-lead titanate, lead lanthanum zirconate titanate, lead zinc niobate, and combinations thereof. The tape head body 402 includes a plurality of electrodes 410A-410D. Electrode 410A and electrode 410B are coupled to the first electrostrictive material 404A. Electrode 410C and electrode 410D are coupled to the second electrostrictive material 404B. The electrodes that are coupled to a common electrostrictive material are oppositely charged.

A first servo head 406A and a second servo head 406B is electrically coupled to the tape head body 402. The first servo head 406A and the second servo head 406B are spaced apart. A plurality of data heads 408A-408N are coupled between the first servo head 406A and the second servo head 406B. It is to be understood that while the plurality of data heads 408A-408N have been shown, the disclosure is not limited to the plurality of data heads 408A-408N. Rather, the number of the plurality of data heads 408A-408N can be more or less than what is shown depending on the requirements of the embodiment.

Reconsidering the 20V application above, by breaking the electrostrictive material 404A, 404B into two separate pieces, the effect of the 20V will be quadrupled due to the electric field being doubled. The voltage is squared based on the number pieces the electrostrictive material. Hence, applying the same 20V results in an increase in movement of four times the amount as occurs if there were only a single piece, and hence, two electrodes. A division of one thousand pieces of electrostrictive material (and hence two thousand electrodes) can increase the strain by one million, for example.

Figure 5A:
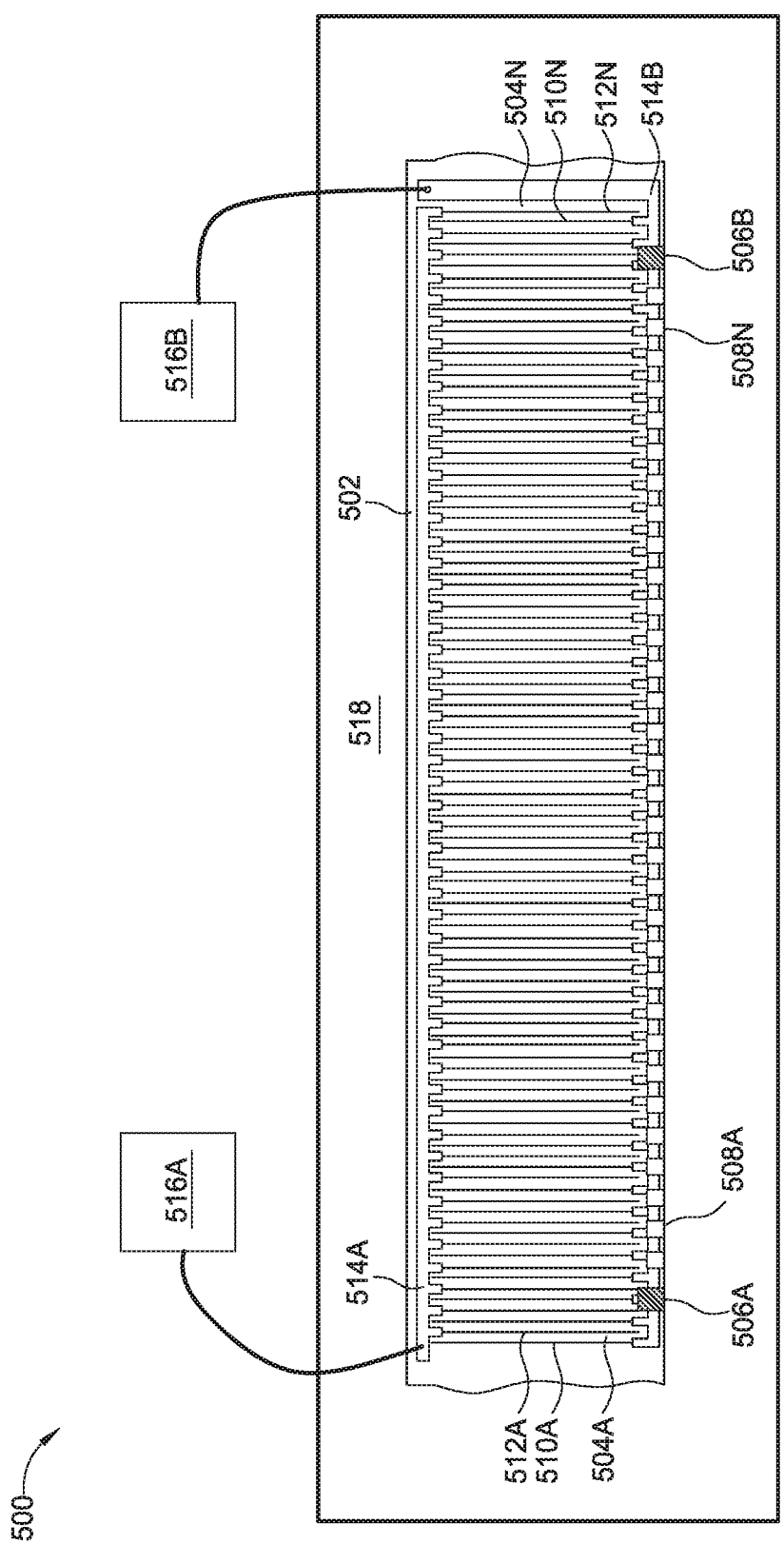
FIG. 5A is a schematic illustration of a tape head having an electrostrictive material according to another embodiment.

FIG. 5A is a schematic illustration of a tape head 500 having an electrostrictive material according to another embodiment. The tape head 500 comprises a tape head body 502. The tape head body 502 is disposed on a substrate 518.

A first busbar 514A is disposed on the tape head body 502, wherein a plurality of first electrodes 510A-510N is electrically coupled to the first busbar 514A. It is to be understood that while the plurality of first electrodes 510A-510N have been shown, the disclosure is not limited to the number of electrodes shown. Rather, the number of the plurality of first electrodes 510A-510N can be more or less than what is shown depending on the requirements of the embodiment. A second busbar 514B is disposed on the tape head body 502, wherein a plurality of second electrodes 512A-512N is electrically coupled to the first busbar 514B. It is to be understood that while the plurality of second electrodes 512A-512N have been shown, the disclosure is not limited to the number of electrodes shown. Rather, the number of the plurality of second electrodes 512A-512N can be more or less than what is shown depending on the requirements of the embodiment. Each electrode of the plurality of first electrodes 510A-510N is spaced apart by electrostrictive material and an electrode of the plurality of second electrodes 512A-512N. Similarly, each electrode of the plurality of second electrodes 512A-512N are spaced apart by electrostrictive material and an electrode of the plurality of first electrodes 510A-510N.

The tape head body 502 also comprises a plurality of electrostrictive material segments 504A-504N. The plurality of electrostrictive material segments 504A-504N comprises, but is not limited to, a material selected from the group consisting of lead magnesium niobate, lead magnesium niobate-lead titanate, lead lanthanum zirconate titanate, lead zinc niobate, and combinations thereof. The plurality of first electrodes 510A-510N is coupled to the electrostrictive material segments 504A-504N. The plurality of second electrodes 512A-512N is coupled to the electrostrictive material segments 504A-504N. Each piece of electrostrictive material of the plurality of electrostrictive material segments 504A-504N is bound by both an electrode the plurality of first electrodes 510A-510N and an electrode of the plurality of second electrodes 512A-512N.

A first servo head 506A and a second servo head 506B is electrically coupled to the tape head body 502. The first servo head 506A and the second servo head 506B are spaced apart. A plurality of data heads 508A-508N are coupled between the first servo head 506A and the second servo head 506B. It is to be understood that while the plurality of data heads 508A-508N have been shown, the disclosure is not limited to the number of data heads 508A-508N shown. Rather, the number of data heads 508A-508N can be more or less than what is shown depending on the requirements of the embodiment.

A first pad 516A is electrically connected to the first busbar 514A. A second pad 516B is electrically connected to the second busbar 514B. The first pad 516A and the second pad 516B provide voltage across the first busbar 514A and the second busbar 514B to between adjacent electrodes. For example 10V is sent from the first busbar 514A to the plurality of electrodes 510A-510N as the plurality of electrodes 510A-510N function as anodes. The second busbar 514B is coupled to the plurality of electrodes 512A-512N and thus functions as a cathode. Alternatively, the voltage applied can be −10V for example to the same effect. The electrical voltage is applied across the electrostrictive material segments 504A-504N such that 10V is sent to each of the plurality of electrostrictive material segments 504A-504N.

Figure 5B:
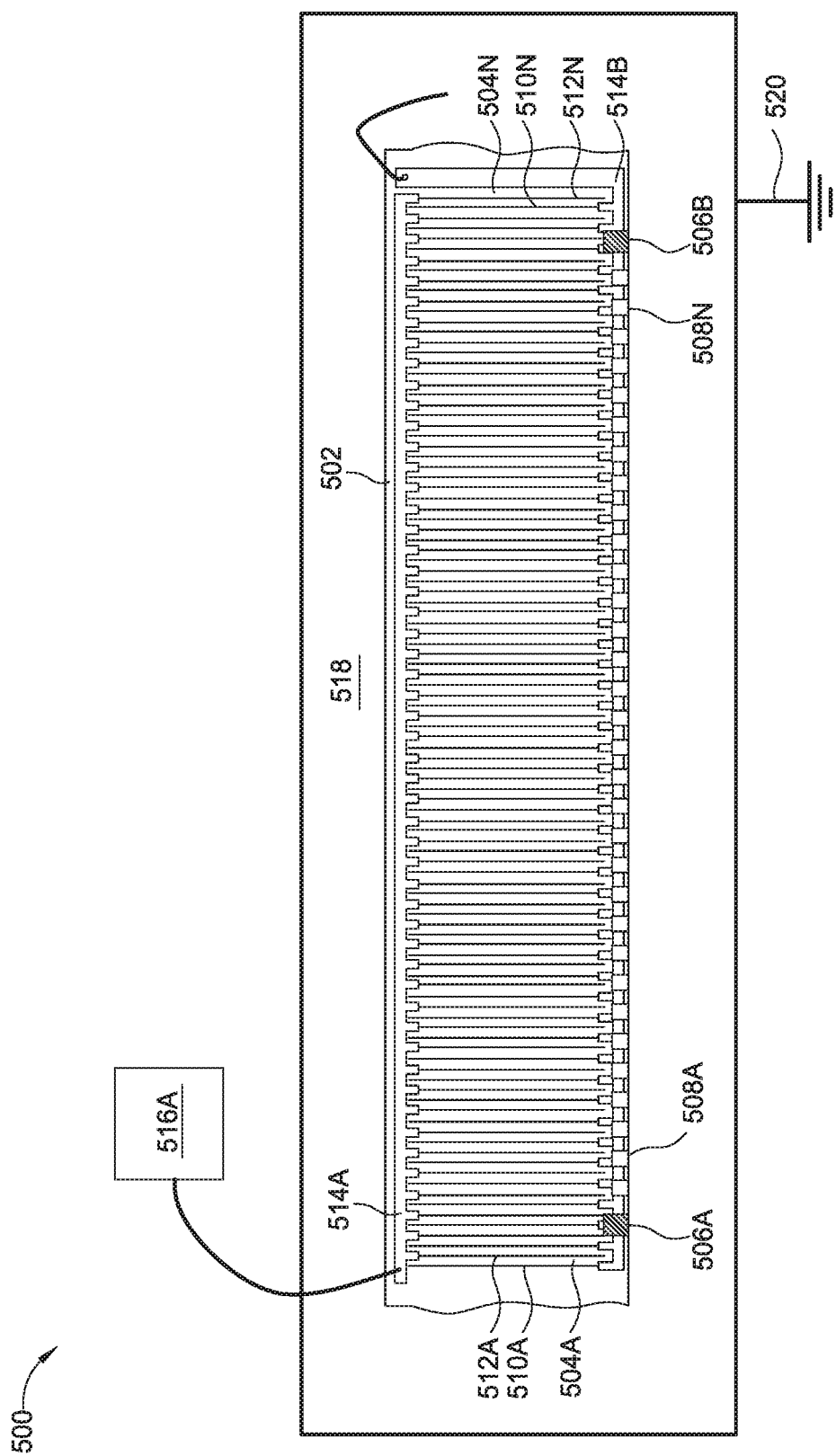
FIG. 5B is a schematic illustration of a tape head having an electrostrictive material according to another embodiment.

FIG. 5B is a schematic illustration of a tape head 500 having an electrostrictive material according to another embodiment. The first pad 516A is electrically connected to the first busbar 514A. The second busbar 514B is electrically coupled to the substrate 518, wherein the substrate 518 is connected to ground 520. For example, current is applied from the first pad 516A. The current flows through the first busbar 514A to the plurality of first electrodes 510A-510N, across the electrostrictive material, to the plurality of second electrodes 512A-512N, to the second busbar 514B, and finally to the substrate 518. Because the substrate 518 is coupled to ground 520, the current flows to ground 520 through the substrate 518.

Figure 6:
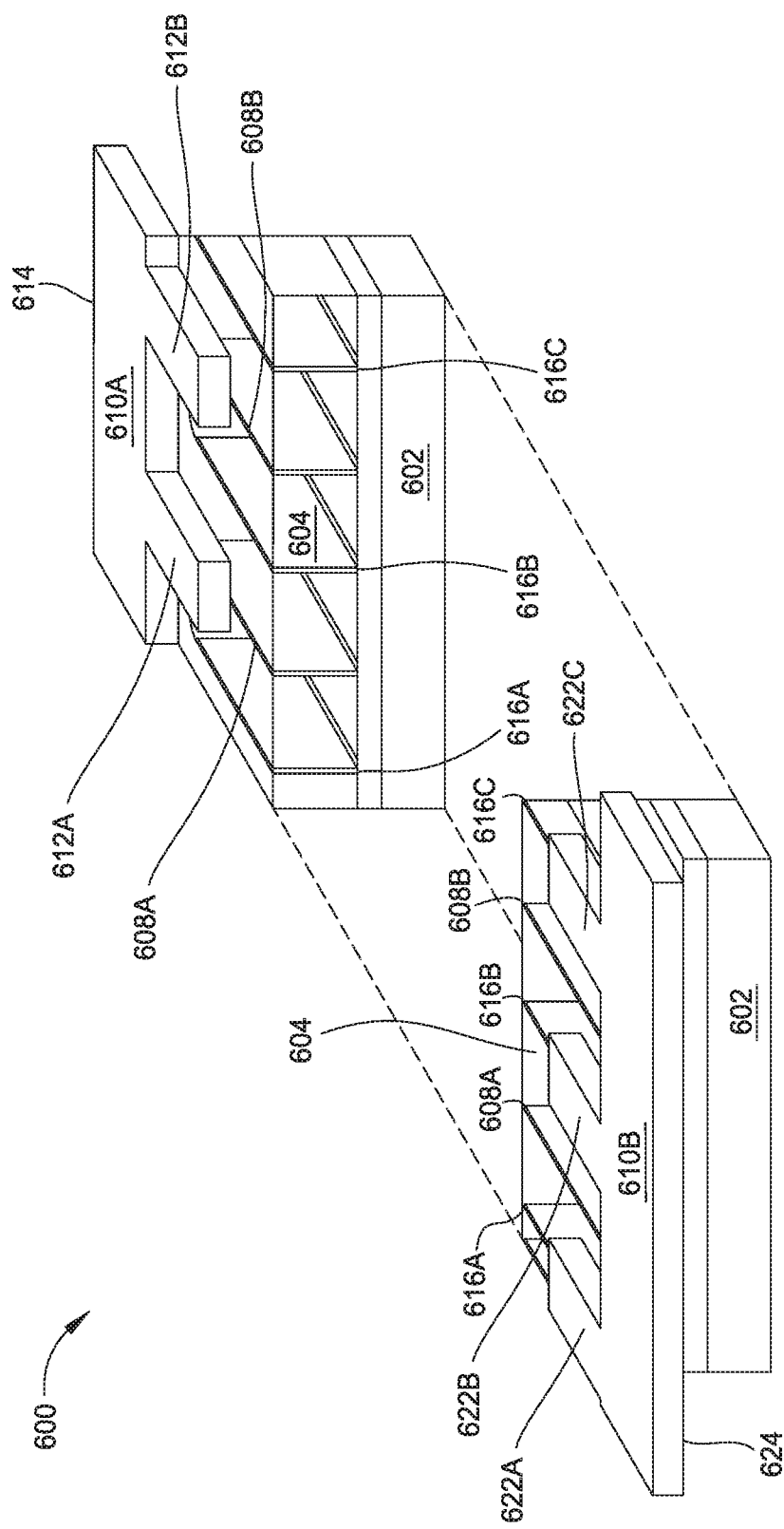
FIG. 6 is a schematic illustration of electrical connections to the electrostrictive material according to one embodiment.

FIG. 6 is a schematic illustration of electrical connections to the electrostrictive material according to one embodiment. The servo heads and data heads are not shown for simplicity. It is to be understood that the servo heads and data heads may be disposed between the substrate 602 and the electrostriction material 604. Alternatively, it is to be understood that the electrostriction material 604 may be disposed between the substrate 602 and the servo heads and data heads.

As shown in FIG. 6, a tape head body 600 is shown that includes a electrostricitive material 604. A first busbar 610A is shown. The first busbar 610A is coupled to a first plurality of electrodes 608A, 608B. A second busbar 610B is also shown. The second busbar 610B is coupled to a second plurality of electrodes 616A-616C. As shown in FIG. 6A, the electrodes of the first plurality of electrodes 608A, 608B are alternately arranged with the electrodes of the second plurality of electrodes 616A-616C. In between adjacent electrodes, electrostriction material is present such that each portion of electrostriction material is bound by both an electrode of the first plurality of electrodes 608A, 608B and an electrode of the second plurality of electrodes 616A-616C. The electrodes of the first plurality of electrodes 608A, 608B are electrically isolated from the electrodes of the second plurality of electrodes 616A-616C by the electrostriction material.

The first busbar 610A includes a plurality of fingers 612A, 612B that extend from a first busbar backbone 614. The fingers 612A, 612B provide the connection to the electrodes of the first plurality of electrodes 608A, 608B. Each finger 612A, 612B is coupled to a corresponding electrode 608A, 608B. It is to be understood that while two electrodes 608A, 608B have been shown, the disclosure is not to be limited to two electrodes 608A, 608B. Rather, additional electrodes 608A, 608B may be present. Additionally, it is to be understood that while two fingers 612A, 612B have been shown, the disclosure is not to be limited to two fingers 612A, 612B. Rather, additional fingers 612A, 612B may be present. In one embodiment, the number of fingers 612A, 612B is equal to the number of electrodes 608A, 608B. Additionally, it is to be understood that while one first busbar backbone 614 has been shown, the disclosure is not to be limited to one first busbar backbone 614. Rather, additional first busbar backbones 614 may be present.

The second busbar 610B includes a plurality of fingers 622A-622C that extends from a second busbar backbone 624. The fingers 622A-622C provides the connection to the electrodes of the second plurality of electrodes 616A-616C. Each finger 622A-622C is coupled to a corresponding electrode 616A-616C. It is to be understood that while three electrodes 616A-616C have been shown, the disclosure is not to be limited to three electrodes 616A-616C. Rather, additional electrodes 616A-616C may be present. Additionally, it is to be understood that while three fingers 622A-622C have been shown, the disclosure is not to be limited to three fingers 622A-622C. Rather, additional fingers 622A-622C may be present. In one embodiment, the number of fingers 622A-622C is equal to the number of electrodes 616A-616C. Additionally, it is to be understood that while one second busbar backbone 624 has been shown, the disclosure is not to be limited to one second busbar backbone 624. Rather, additional second busbar backbones 624 may be present.

FIGS. 7A-7E are schematic illustrations of a tape head 700 at various stages of manufacture according to one embodiment. FIG. 8 is a flowchart 800 illustrating a method of manufacturing a tape head according to one embodiment. FIGS. 7A-7E and FIG. 8 will be described together below.

Figure 7A:
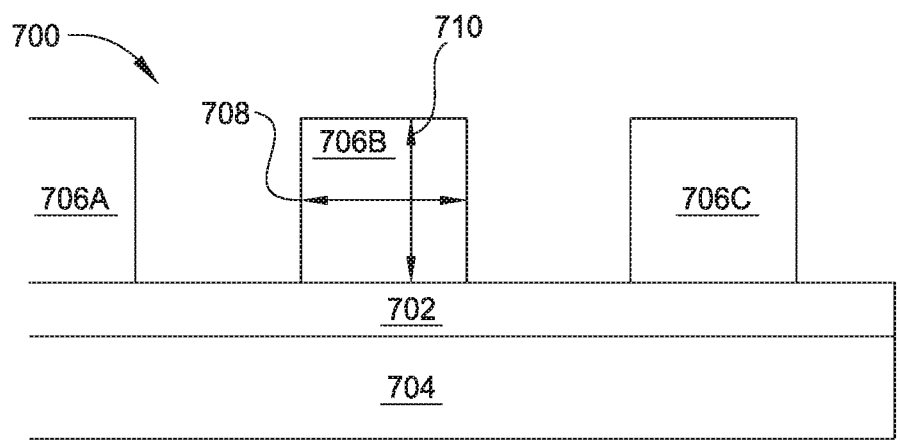
FIGS. 7A-7E are schematic illustrations of a tape head at various stages of manufacture according to one embodiment.
Figure 8:
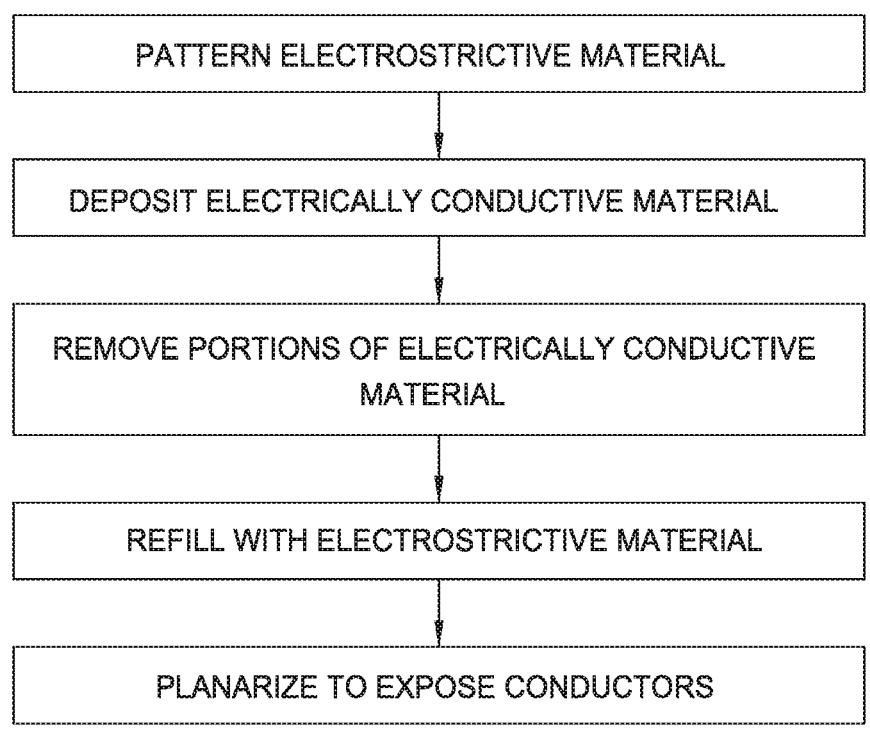
FIG. 8 is a flowchart illustrating a method of manufacturing a tape head according to one embodiment.

Referring to FIG. 7A, a plurality of electrostricitve material 706A-706C disposed on a tape head body 702 and substrate 704. The electrostrictive material is patterned on the tape head body 702 in step 802. The patterned electrostrictive material 706A-706C may be formed by blanket depositing electrostrictive material and then patterning, through etching or milling for example, the electrostrictive material to form the patterned electrostrictive material 706A-706C. Alternatively, the patterned electrostrictive material 706A-706C may be formed by selectively depositing the electrostrictive material. In one embodiment, the patterned electrostrictive material 706A-706C has a width 708 and a height 710. In one embodiment, the width 708 may be between about 1 micron to about 5 micron, such as about 3 microns. In another embodiment, the height 710 may be between about 1 micron to about 5 microns, such as about 3 microns. In another embodiment, the width 708 and the height 710 may be substantially equal. In another embodiment, the width 708 and the height 710 may be different.

Figure 7B:
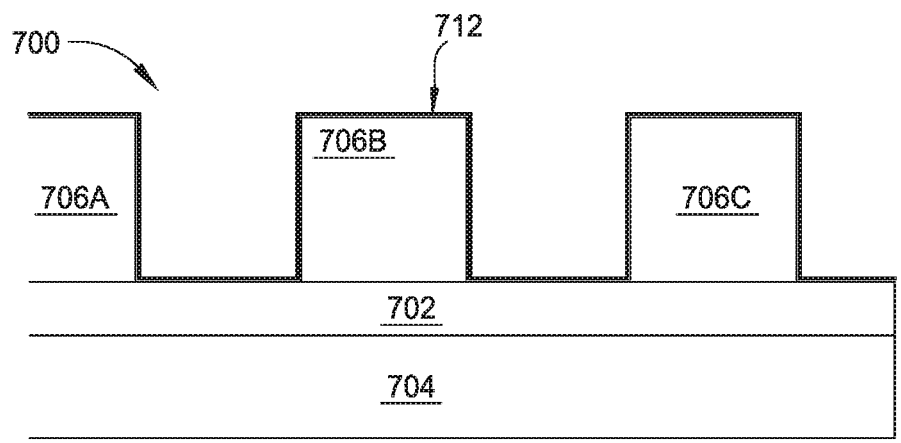

Referring to FIG. 7B, an electrically conductive material 712 is deposited over the tape head body 702 and the patterned electrostrictive material 706A-706C in step 804. The conductive material 712 may be deposited by well-known means such as sputtering, electroless plating, electrochemical plating, atomic layer deposition, and chemical vapor deposition, among others. Additionally, the electrically conductive material may comprise any well-known conductive material such as copper, titanium, tungsten, aluminum, and other metals.

Figure 7C:
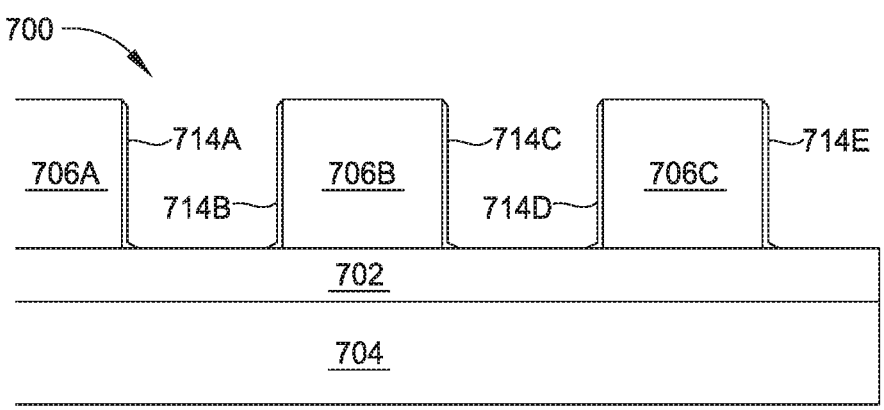

Referring to FIG. 7C, portions of the conductive material 712 are removed in step 806. The portions of the conductive material 712 that are removed are on top of the patterned electrostrictive material 706A-706C and between adjacent electrostrictive material 706A-706C. In so removing the portions of the conductive material 712, electrodes 714A-714E are formed on the vertical sides of the plurality of electrostrictive material 706A-706C. The portions of the conductive material 712 may be removed by well-known methods such as etching and milling. The removal results in portions of the tape head body 702 being exposed.

Figure 7D:
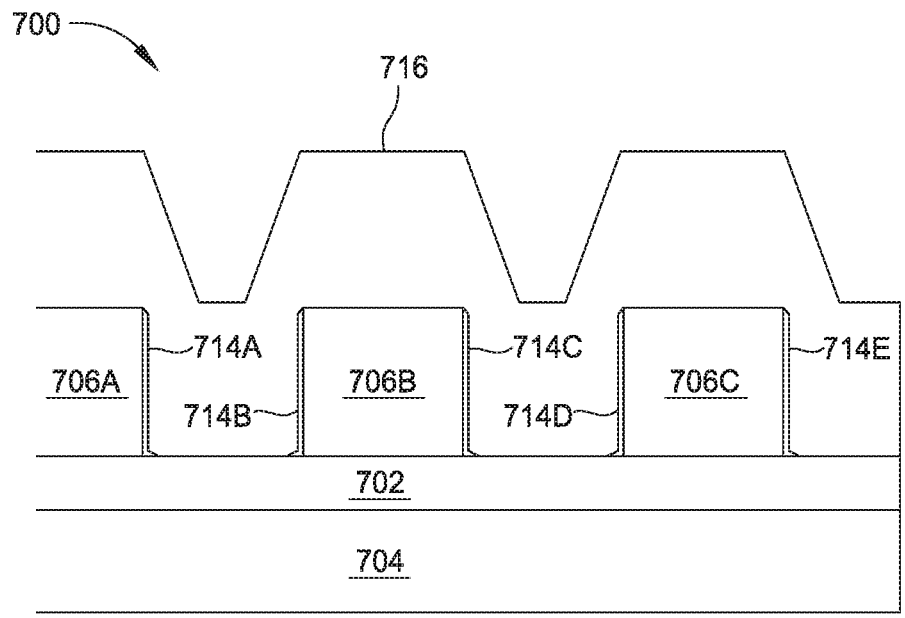

Referring to FIG. 7D, additional electrostrictive material 716 is deposited or refilled in between adjacent electrodes 714A-714E, on the exposed tape head body 704, and on top of the already present electrostrictive material 706A-706C in step 808. In one embodiment, the additional electrostrictive material 716 is the same material as the patterned electrostrictive material 706A-706C. In another embodiment, the additional electrostrictive material 716 may comprise different electrostrictive material than the patterned electrostrictive material 706A-706C.

Figure 7E:
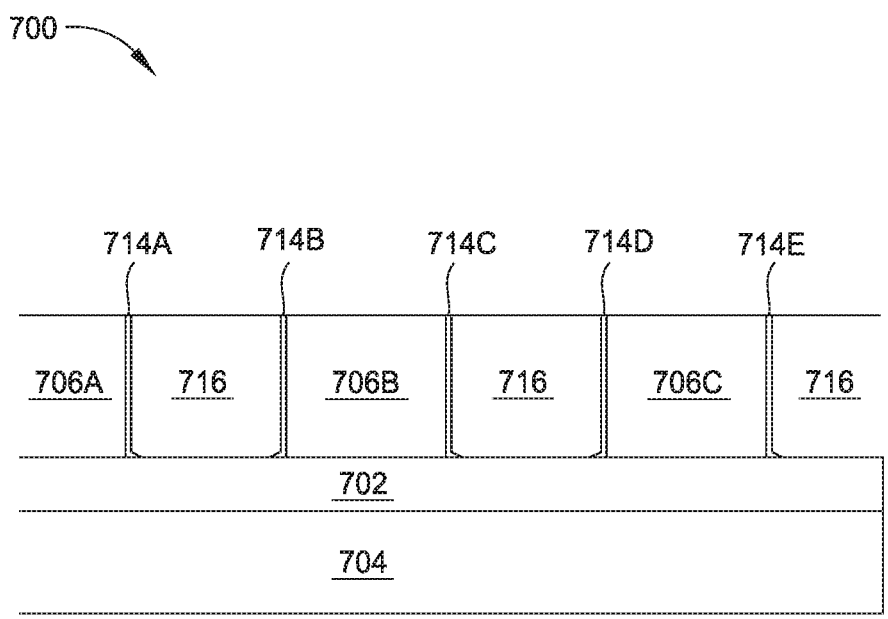

Referring to FIG. 7E, additional electrostrictive material 716 may be planarized to remove excess material and expose the electrodes 714A-714E in step 810. The electrodes 714A-714E may act as an etch stop or a polish stop during the removal process. The additional electrostritive material 716 may be removed by well-known processes such as etching chemical mechanical polished (CMP). Once the excess electrostrictive material 716 has been removed and the electrodes 714A-714E exposed, the electrodes 714A-714E can be connected to busbars and the tape head manufacture can continue.

In one embodiment, a tape head is disclosed. The tape head comprises a tape head body having: a first servo head; a second servo head; and a plurality of data heads disposed between the first servo head and the second servo head. The tape head also comprises an electrostrictive material coupled to the tape head body. The tape head further comprises a first electrode coupled to the electrostrictive material; and a second electrode coupled to the electrostrictive material. The first electrode is coupled to a first pad, and the second electrode is coupled to ground. The first electrode is spaced from the second electrode by a distance that is less than or equal to spacing between adjacent data heads. The electrostrictive material comprises a material selected from the group consisting of lead magnesium niobate, lead magnesium niobate-lead titanate, lead lanthanum zirconate titanate, lead zinc niobate, and combinations thereof. The tape head is a read head. The tape module data elements may be either read heads, write heads, piggyback or modules that contain both read heads and write heads.

In another embodiment, a tape head is disclosed. The tape head comprises a tape head body having: a first servo head; a second servo head; and a plurality of data heads disposed between the first servo head and the second servo head. The tape head also comprises a plurality of segments of electrostrictive material coupled to the tape head body; a first conductive material coupled to a first portion of each segment of the plurality of segments of electrostrictive material; and a second conductive material coupled to a second portion of each segment of the plurality of segments of electrostrictive material, wherein the first conductive material is electrically isolated from the second conductive material. The electrostrictive material comprises a material selected from the group consisting of lead magnesium niobate, lead magnesium niobate-lead titanate, lead lanthanum zirconate titanate, lead zinc niobate, and combinations thereof. The first conductive material and the second conductive material comprise the same material. The plurality of segments of electrostrictive material is recessed from a media facing surface. The number of segments of the plurality of segments of electrostrictive material is greater than the number of data heads.

In another embodiment, a tape head is disclosed. The tape head comprises a tape head body disposed on a substrate, the tape head body having: a first servo head; a second servo head; and a plurality of data heads disposed between the first servo head and the second servo head. The tape head also comprises an electrostrictive material coupled to the tape head body; and a plurality of electrodes interspersed within the electrostrictive material, wherein a first number of the plurality of electrodes are electrically coupled together, wherein a second number of the plurality of electrodes are electrically coupled together, and wherein the first number of the plurality of electrodes are electrically isolated from the second number of the plurality of electrodes. The first number of the plurality of electrodes is coupled together by a first busbar. The second number of the plurality of electrodes is coupled together by a second busbar. The first busbar is coupled to a first pad and the second busbar is coupled to a second pad separate from the first pad. The first busbar is coupled to a first pad and the second busbar is coupled to the substrate. The electrostrictive material comprises a material selected from the group consisting of lead magnesium niobate, lead magnesium niobate-lead titanate, lead lanthanum zirconate titanate, lead zinc niobate, and combinations thereof. The number of electrodes of the plurality of electrodes is greater than the number of data heads of the plurality of data heads. The first number of the plurality of electrodes is alternately arranged with electrodes of the second number of the plurality of electrodes.

By using an electrostrictive material in a tape head, the tape head can be expanded or contracted as necessary to ensure the data elements of the tape head properly align with the data tracks of the tape. The expansion or contraction of the tape head ensures the spacing between adjacent data elements substantially matches the spacing between adjacent data tracks and thus, properly aligns the tape head with the tape without damaging the tape.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
a tape head body comprising an electrostrictive material and having:
a first surface;
a first servo head disposed on the first surface of the tape head body;
a second servo head disposed on the first surface of the tape head body; and
a plurality of data heads disposed on the first surface of the tape head body between the first servo head and the second servo head;
a plurality of first electrodes in contact with the electrostrictive material; and
a plurality of second electrodes in contact with the electrostrictive material, wherein the plurality of first electrodes are spaced from the plurality of second electrodes by a distance that is less than or equal to spacing between adjacent data heads.

2. The tape head of claim 1, wherein the plurality of first electrodes are electrically coupled to a first pad.

3. The tape head of claim 1, wherein the plurality of second electrodes are electrically coupled to ground.

4. The tape head of claim 1, wherein the electrostrictive material comprises a material selected from the group consisting of lead magnesium niobate, lead magnesium niobate-lead titanate, lead lanthanum zirconate titanate, lead zinc niobate, and combinations thereof.

5. A tape drive, comprising:
a tape head, the tape head comprising:
a tape head body comprising an electrostrictive material and having:
a first surface;
a first servo head disposed on the first surface of the tape head body;
a second servo head disposed on the first surface of the tape head body; and
a plurality of data heads disposed on the first surface of the tape head body between the first servo head and the second servo head;
a plurality of first electrodes in contact with the electrostrictive material; and
a plurality of second electrodes in contact with the electrostrictive material,
wherein the plurality of first electrodes are spaced from the plurality of second electrodes by a distance that is less than or equal to spacing between adjacent data heads.

6. A tape head, comprising:
a tape head body having:
a first servo head;
a second servo head; and
a plurality of data heads disposed between the first servo head and the second servo head;
a plurality of segments of electrostrictive material coupled to the tape head body;
a first conductive material coupled to a first portion of each segment of the plurality of segments of electrostrictive material; and
a second conductive material coupled to a second portion of each segment of the plurality of segments of electrostrictive material, wherein the first conductive material is electrically isolated from the second conductive material.

7. The tape head of claim 6, wherein the electrostrictive material comprises a material selected from the group consisting of lead magnesium niobate, lead magnesium niobate-lead titanate, lead lanthanum zirconate titanate, lead zinc niobate, and combinations thereof.

8. The tape head of claim 6, wherein the first conductive material and the second conductive material comprise the same material.

9. The tape head of claim 6, wherein the plurality of segments of electrostrictive material is recessed from a media facing surface.

10. The tape head of claim 6, wherein the number of segments of the plurality of segments of electrostrictive material is greater than the number of data heads.

11. A tape drive, comprising:
a tape head, comprising:
a tape head body having:
a first servo head;
a second servo head; and
a plurality of data heads disposed between the first servo head and the second servo head;
a plurality of segments of electrostrictive material coupled to the tape head body;
a first conductive material coupled to a first portion of each segment of the plurality of segments of electrostrictive material; and
a second conductive material coupled to a second portion of each segment of the plurality of segments of electrostrictive material, wherein the first conductive material is electrically isolated from the second conductive material.

12. A tape head, comprising:
a tape head body disposed on a substrate, the tape head body having:
a first servo head;
a second servo head; and
a plurality of data heads disposed between the first servo head and the second servo head;
an electrostrictive material coupled to the tape head body; and
a plurality of electrodes interspersed within the electrostrictive material, wherein a first number of the plurality of electrodes are electrically coupled together, wherein a second number of the plurality of electrodes are electrically coupled together, and wherein the first number of the plurality of electrodes are electrically isolated from the second number of the plurality of electrodes.

13. The tape head of claim 12, wherein the first number of the plurality of electrodes are coupled together by a first busbar.

14. The tape head of claim 13, wherein the second number of the plurality of electrodes are coupled together by a second busbar.

15. The tape head of claim 14, wherein the first busbar is coupled to a first pad and the second busbar is coupled to a second pad separate from the first pad.

16. The tape head of claim 15, wherein the first busbar is coupled to a first pad and the second busbar is coupled to the substrate.

17. The tape head of claim 12, wherein the electrostrictive material comprises a material selected from the group consisting of lead magnesium niobate, lead magnesium niobate-lead titanate, lead lanthanum zirconate titanate, lead zinc niobate, and combinations thereof.

18. The tape head of claim 12, wherein the number of electrodes of the plurality of electrodes is greater than the number of data heads of the plurality of data heads.

19. The tape head of claim 12, wherein electrodes of the first number of the plurality of electrodes are alternately arranged with electrodes of the second number of the plurality of electrodes.

20. A tape drive, comprising:
a tape head, the tape head comprising:
a tape head body disposed on a substrate, the tape head body having:
a first servo head;
a second servo head; and
a plurality of data heads disposed between the first servo head and the second servo head;
an electrostrictive material coupled to the tape head body; and
a plurality of electrodes interspersed within the electrostrictive material,
wherein a first number of the plurality of electrodes are electrically coupled together, wherein a second number of the plurality of electrodes are electrically coupled together, and wherein the first number of the plurality of electrodes are electrically isolated from the second number of the plurality of electrodes.

* * * * *